Aug. 24, 1954

G. H. LEE 2,687,491

ULTRAHIGH-FREQUENCY VACUUM TUBE

Filed May 15, 1946

Inventor
George H. Lee

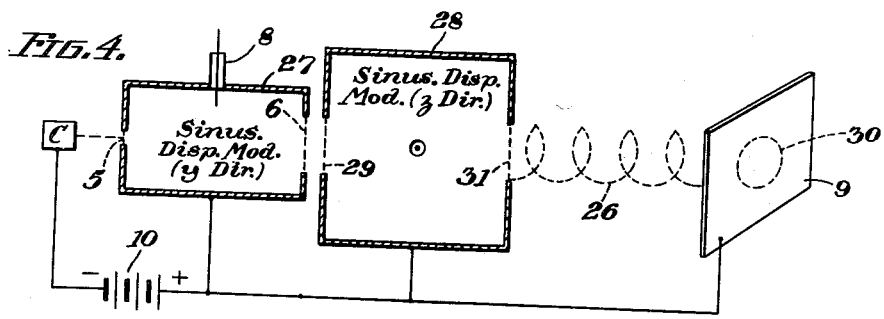
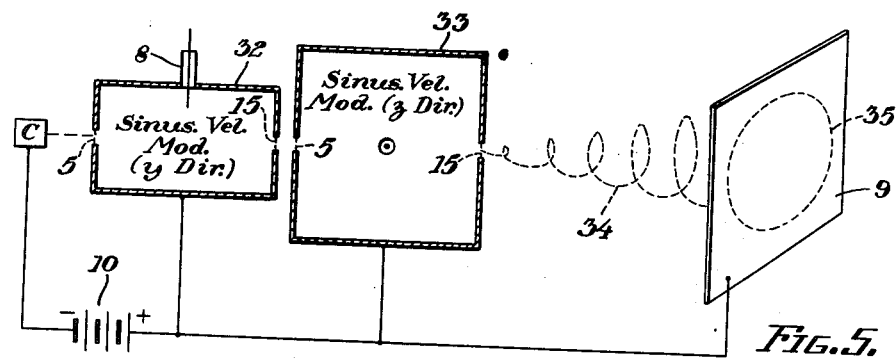
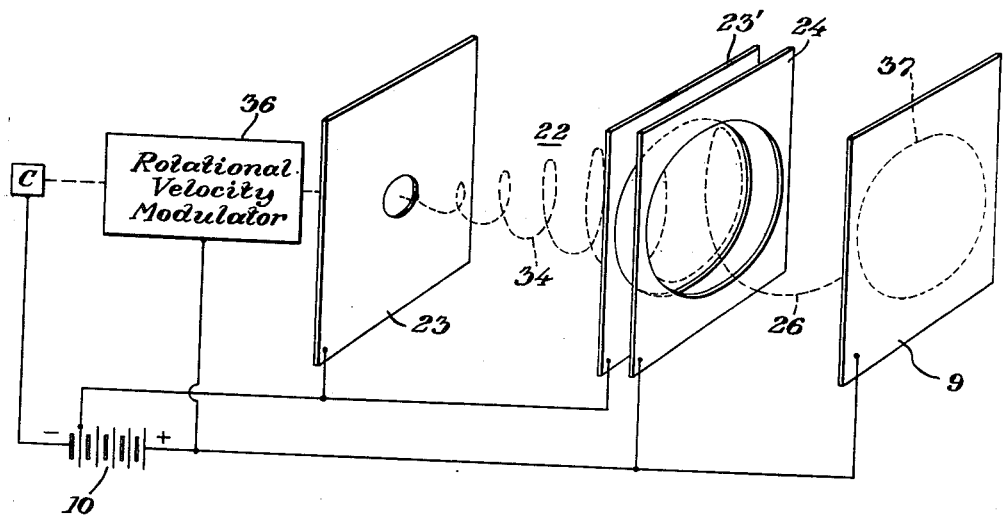

Aug. 24, 1954     G. H. LEE     2,687,491
ULTRAHIGH-FREQUENCY VACUUM TUBE
Filed May 15, 1946     6 Sheets-Sheet 3

Inventor
George H. Lee

Inventor
George H. Lee

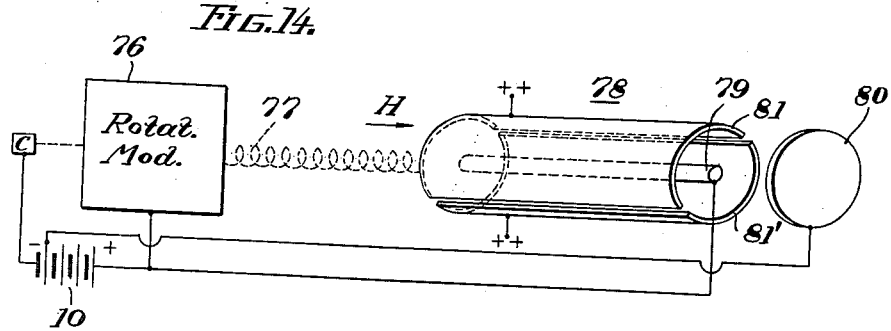
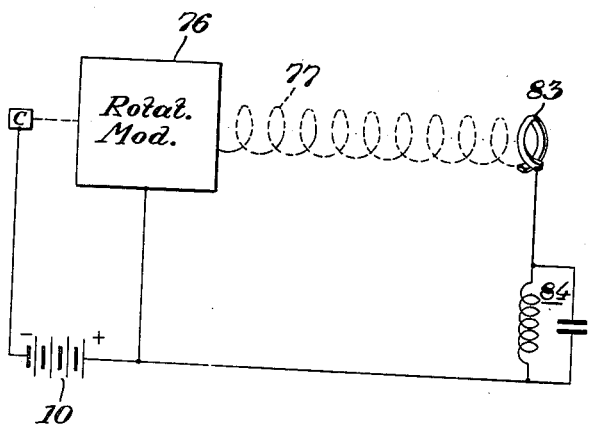
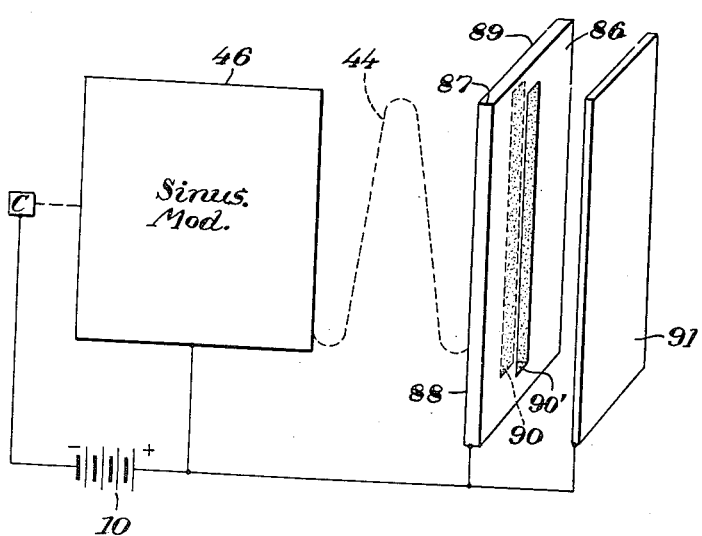

Inventor
George H. Lee

Patented Aug. 24, 1954

2,687,491

UNITED STATES PATENT OFFICE 2,687,491

ULTRAHIGH-FREQUENCY VACUUM TUBE

George H. Lee, Troy, N. Y.

Application May 15, 1946, Serial No. 669,811

33 Claims. (Cl. 315—6)

This invention relates to improvements in electric discharge apparatus adapted particularly to operate in the ultra-high and hyper-frequency regions of the electromagnetic spectrum.

As is well known, no thoroughly satisfactory type of vacuum tube has as yet been developed to operate at these frequencies. A new type of tube has been consistently sought which can as effectively and efficiently accomplish all the ordinary functions of a vacuum tube, such as generation, amplification, modulation, and detection, at these very high frequencies as the conventional tube does at lower frequencies. In spite of this, presently known types of ultra-high frequency tubes are all subject to one or another of certain seemingly inherent disadvantages or limitations.

Perhaps the most important weakness of all known types of ultra-high frequency tubes is their universally poor efficiency. Although this poor efficiency arises from different immediate causes in the different types of tube, nevertheless, it appears so consistently and relentlessly that it would almost appear to be an inherent characteristic to be expected in any type of ultra-high frequency tube that might ever be developed. Also, certain types of ultra-high frequency tubes present severe problems with respect to capacitance and interaction between electrodes. Certain other types are peculiarly limited as to function, that is, they lend themselves to use as oscillators but cannot be used as amplifiers, modulators, or detectors.

In prior types of ultra-high frequency tubes, the operative electrons, that is, the electrons which interchange energy with the high frequency electric field, are originated or introduced continuously and at the same point or region within the tube. Some of these electrons are in the proper phase to contribute energy to the high frequency field, as desired, but, in every case, some also are in an improper phase, and these electrons of improper phase actually derive energy from the high frequency field, thereby accounting for the generally poor efficiency of known ultra-high frequency tubes.

The present inventor has conceived that the efficiency of prior tubes might be improved by permitting the origin of operative electrons only at such times and at such points that they may be employed to contribute energy to the high frequency field, and by preventing the origin of operative electrons at such times and at such points that they would derive energy from the high frequency field. In some modifications of the invention, operative electrons are provided at only one point or region, as in the prior devices; but, in these modifications, the operative electrons are caused to appear periodically over a certain portion of the cycle only, rather than continuously, as before. In other modifications of the invention, the point of appearance of operative electrons is cyclically varied such that each operative electron has the proper time-space relationship with respect to the electric field to contribute energy to the field rather than derive energy from the field.

The above has been accomplished by employing, in conjunction with one or another prior type of ultra-high frequency tube, an auxiliary electron beam, this electron beam having been operated on or modulated prior to its entry into the conventional portion of the apparatus. In some forms of the invention, this electron beam itself contains the operative electrons, and in others, the beam is employed as the originating agency for the operative electrons. Novel electron beam deflecting or modulating apparatus has been provided, which is particularly adapted to the high frequencies involved, and this apparatus may be employed as the required electron beam modulating means.

Accordingly, it is the principal object of the present invention to provide improved vacuum tubes adapted to operate in the ultra-high frequency region and above.

It is an object of the invention to improve the operating efficiency of conventional ultra-high frequency tubes.

It is another object of the invention to provide an ultra-high frequency tube wherein the operative electrons are all in the proper time-space relationship with respect to the high frequency field so as to contribute energy to the field.

Still another object of the invention is to provide an ultra-high frequency tube wherein the operative electrons are all in the optimum time-space relationship with respect to the high frequency field so as to contribute a maximum and equal amount of energy to the field.

A further object of the invention is to provide an ultra-high frequency tube wherein operative electrons are provided only in the correct phase to contribute energy to the high frequency field.

Still a further object of the invention is to provide novel electron beam deflecting or modulating apparatus particularly adapted to operate at ultra-high frequencies.

Other objects and advantages will become apparent from the following description, taken in connection with the accompanying drawings, wherein the invention is embodied in concrete form.

In the drawings,

Fig. 4 is a diagrammatic view, partially in section and partially in perspective, of a cavity resonant system, for providing a rotational displacement modulated electron beam.

Fig. 5 is a diagrammatic view, partially in section and partially in perspective, of a cavity resonant system for providing a rotational velocity modulated electron beam.

Fig. 6 is a diagrammatic view, partially in perspective, of another form of cavity resonant system for providing a substantially rotational displacement modulated electron beam.

Fig. 14 is a diagrammatic view, partially in perspective, of an embodiment of the invention involving the principles of operation of the split-anode magnetron.

Fig. 15 is a diagrammatic view, partially in perspective, of an embodiment of the invention involving to some extent the principles of operation of the deflection valve type of electron tube.

Fig. 16 is a diagrammatic view, partially in perspective, of a basically new cavity resonant type of ultra-high frequency electron tube.

Figure 1:
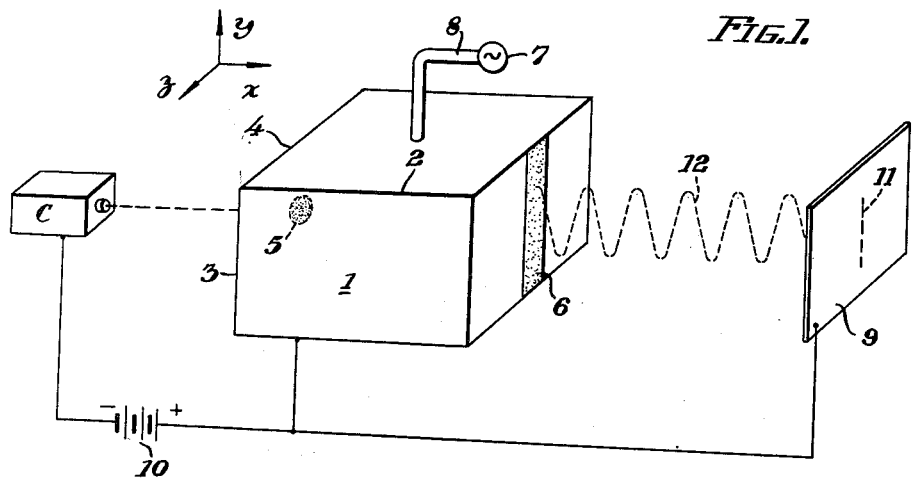
Fig. 1 is a diagrammatic perspective view of a cavity resonant system for providing a sinusoidal displacement modulated electron beam.

The arrangements shown in the drawings are in the main largely diagrammatic and consist only of those features which are necessary to a complete understanding of the invention. The various supporting structures and auxiliary equipment may take any suitable form known to those skilled in the art of electron tube design. Such structure and equipment, which form no part of the present invention, have not been shown since so doing would serve only to obscure rather than disclose the invention.

In Fig. 1 of the drawings a convention with respect to directions is set up in the form of a rectangular coordinate system having the axis $x$, $y$, and $z$, the $x$ axis being horizontal in the plane of the paper, the $y$ axis being vertical in the plane of the paper, and the $z$ axis being horizontal and perpendicular to the $x$—$y$ plane. This system of coordinates is the same as is followed in chapter 10 of "Hyper and Ultra-High Frequency Engineering," by Sarbacher and Edson, published by John Wiley & Sons, Inc., September 1944. The convention employed in that publication for designating resonant modes of oscillation within a cavity resonator, and also the terminology employed therein, is followed throughout this specification. Although the coordinate system is indicated only on Fig. 1 of the drawings, it will be understood that it is applicable to all of the figures.

In Figs. 1 through 6 of the drawings, there are disclosed novel, basic electron beam deflecting or modulating systems utilizing cavity resonators as the modulating means. These basic modulating systems, which are set out in Figs. 1 through 6, are preferably, although not necessarily, employed as the modulating means for the electronic discharge devices forming the principal portion of the present invention and disclosed in the other figures of the drawings.

Referring now to Fig. 1, there is shown a rectangular hollow cavity resonator, indicated generally by the reference numeral 1, and having dimensions in the $x$, $y$, and $z$ directions represented by the lengths of its respective edges 2, 3, and 4. The leftmost face of resonator 1 is apertured in its center, and fitted into this aperture is a circular entrance grid 5 through which an electron beam is permitted to enter the resonator. In the right-hand face of resonator 1 there is provided a vertically elongated aperture, and fitted therein is an emergent grid 6 through which the electron beam emerges from the resonator. The cavity resonator 1 is suitably energized to resonate in a particular mode, as will later be described in detail, at an ultra-high operating frequency. The energizing means is schematically indicated to be a source 7 of ultra-high frequency electromagnetic energy which is coupled to a suitable probe, not shown, extending within the resonator 1 by way of a suitable transmission channel 8, which may be a concentric cable.

Although the invention resides within the resonator itself and its method of operating upon the electron beam traversing it, in order to indicate its operation, it is shown connected in a complete electrical circuit which comprises a suitable electron gun or cathode, schematically indicated at C, and a collecting plate 9 maintained at a high positive potential with respect to the cathode C by means of any suitable direct current source, indicated as battery 10. The resonator 1 is also connected to the positive terminal of battery 10. The electron gun or cathode C will be understood to include all the ordinary features thereof, such as suitable accelerating, collimating, focussing and control electrodes, as required.

In operation the electron gun C emits a pencil beam of electrons which is accelerated to a high velocity corresponding to the high potential of resonator 1 and thereafter proceeds at this velocity through the resonator to the collecting plate 9. As will hereinafter be explained, successive electrons will emerge from the resonator ship between the electron beam accelerating potential, the operating frequency, and the dimension 2 must be such that the transit time of the electron beam through the cavity resonator 1 is exactly equal to an even integral number of half periods, say perhaps 10, but the smaller the better. Under these conditions, it may be shown that almost pure sinusoidal transverse velocity modulation, as indicated at 13, will be obtained. It is true that a small amount of sinusoidal displacement modulation will also appear under these circumstances, but substantially all of this displacement modulation will be in phase with the sinusoidal transverse velocity modulation, in which case, it is obviously unobjectionable.

Figure 2:
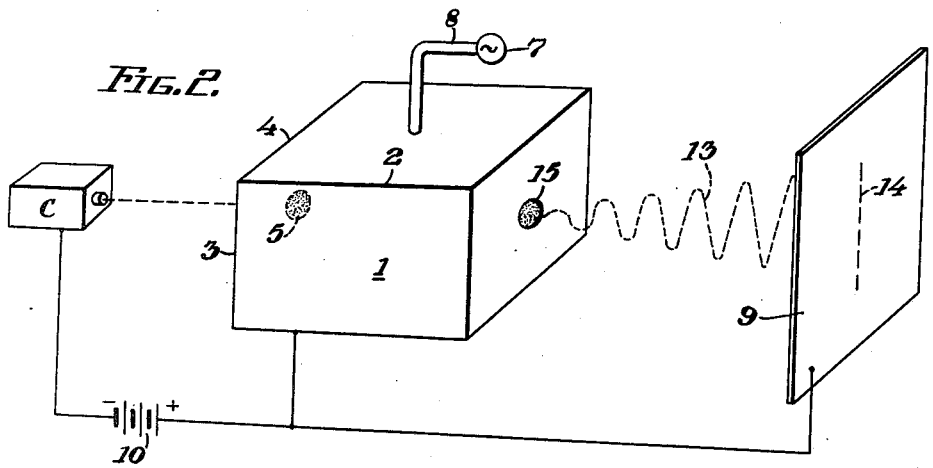
Fig. 2 is a diagrammatic perspective view of a cavity resonant system for providing a sinusoidal velocity modulated electron beam.

It has been stated above that when the dimension 2 is equal to a half guide wave length, sinusoidal displacement modulation, as shown in Fig. 1 will be obtained if the transit time of the electrons through the resonator is made equal to an odd integral number of half periods, and sinusoidal transverse velocity modulation, as shown in Fig. 2, will be obtained if the transit time is made equal to an even integral number of half periods. It will be apparent therefore that if the dimension 2 is equal to a half guide wave length, one or the other of these two types of sinusoidal modulations will be obtained if the transit time is made equal to an even integral number of quarter periods.

Although the cavity resonators shown in the drawings and described in the specification are rectangular in form, it will be understood that anyone skilled in this art could easily adapt resonators having many different geometrical configurations to the desired ends without departing from the principles of the invention. For instance, a cylindrical or spherical resonator oscillating in a mode such that the only component of electric field intensity present is along the vertical or $y$ direction could be employed.

For some applications, it may be desirable to provide a sinusoidal displacement modulated electron beam having a greater amplitude of modulation, that is a greater maximum displacement than can conveniently be obtained with the sinusoidal displacement modulation system shown in Fig. 1. Obviously, in the apparatus of Fig. 1, the amplitude of modulation of the emergent electron beam can never be greater than half the dimension 3. For such an application, an electron beam may first be sinusoidal transverse velocity modulated by the apparatus described with respect to Fig. 2 and then allowed to expand rapidly in a drift space of low potential wherein its horizontal velocity is small as compared to the vertical velocity of modulation. After expansion, the beam can again be accelerated to a high horizontal velocity such that the maximum vertical velocity is negligible as compared to its horizontal velocity, whereby, for all practical purposes, it can then be considered a sinusoidal displacement modulated beam.

Figure 3:
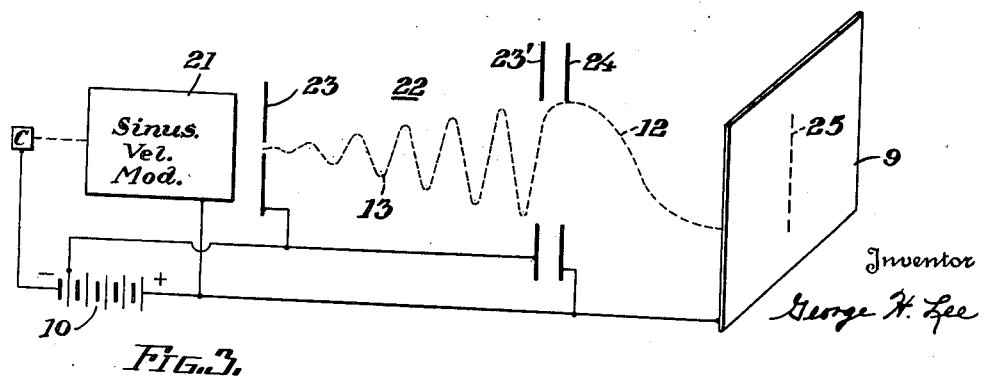
Fig. 3 is a diagrammatic view, partially in perspective, of another form of cavity resonant system for providing a substantially sinusoidal displacement modulated electron beam.

Apparatus for accomplishing the foregoing is shown in Fig. 3, wherein 21 represents a cavity resonator operating as a sinusoidal transverse velocity modulator as described with respect to Fig. 2. A drift space 22 is provided on the emergent side of modulator 21 by any suitable means, indicated, in this case, as centrally apertured electrodes 23, 23' which are maintained at a very small positive potential with respect to the cathode C by being connected near but on the positive side of the negative terminal of battery 10. Another centrally apertured electrode 24 is provided between electrode 23' and collecting plate 9, this electrode being connected to the positive side of battery 10 along with the collecting plate 9 and modulator 21, so as to operate as an accelerating electrode.

In operation, the sinusoidal transverse velocity modulated emergent beam 13 will be immediately decelerated to a horizontal velocity corresponding to the low potential of electrode 23. It will then proceed through drift space 22 at a constant low horizontal velocity. As previously stated, the fact that its horizontal velocity through this region is low will have the effect of accentuating the vertical velocity of modulation, and the beam will expand at a rapid rate until it emerges from drift space 22 through the aperture in electrode 23'. The beam will then be rapidly accelerated to a horizontal velocity corresponding to the high positive potential of electrode 24, and it will continue on at this high constant horizontal velocity until it impinges on collecting plate 9 forming the trace 25. On the emergent side of electrode 24, its horizontal velocity is so high as compared to its vertical velocity of modulation that it will proceed at a substantially constant vertical displacement, and therefore it can be employed as a high amplitude sinusoidal displacement modulated beam, indicated at 12.

In Fig. 4 there is shown cavity resonant modulating apparatus for producing what will be referred to hereinafter as a "rotational displacement modulated" electron beam, a beam modulated in this manner being now defined as a beam all of the electrons of which are travelling at a constant horizontal velocity, and succeeding electrons of which are displaced a constant distance from a central axis along a vector which rotates linearly with time at the operating frequency. Such a rotational displacement modulated beam is indicated at 26 in Fig. 4. A modulating system for producing such a beam will hereinafter be referred to as a "rotational displacement modulator."

As shown in Fig. 4, the unmodulated electron beam in this case is caused to traverse a first sinusoidal displacement modulator 27 and then a second sinusoidal displacement modulator 28. Sinusoidal displacement modulator 27 may be identical to that described with respect to Fig. 1, thereby producing an emergent beam which is sinusoidal displacement modulated in the $y$ direction, as indicated at 12 in Fig. 1. Sinusoidal displacement modulator 28 is identical with modulator 27 except that: (1) it is rotated 90° about a horizontal axis so as to sinusoidally modulate the traversing beam in the horizontal $z$ direction, (2) its entrance grid 29 is formed as a vertical strip in order to accommodate the already displacement modulated entering beam, and (3) its emergent grid 31 is of a circular form in order to permit emergence of the rotational displacement modulated beam.

The distance between grids 6 and 29 is such that the electron transit time therebetween is exactly an odd number of quarter periods. Accordingly, the resultant sinusoidal displacement modulation in the $y$ direction is 90° out of phase with respect to the resultant sinusoidal displacement modulation in the $z$ direction; in other words, a particular electron which emerges from modulator 27 with a maximum displacement in the $y$ direction does not experience any resultant displacement in the $z$ direction while traversing modulator 28, and a particular electron which 1 with a vertical displacement which varies sinusoidally with time at the ultra-high frequency at which the resonator is oscillating. Thus, at any particular instant of time, the electrons disposed between the emergent grid 6 and the collecting plate 9 form a sinusoidal ribbon, indicated at 12. All electrons eventually strike collecting plate 9 forming the trace 11. It will be stressed that the sinusoidal pattern 12 does not indicate the path followed by any particular electron but rather is a picture of a pattern formed by many electrons at a particular instant. Henceforth in this specification, this type of electron beam modulation will be referred to as "sinusoidal displacement modulation" and means for producing such modulation will be referred to as a "sinusoidal displacement modulator." In this type of modulation, all electrons proceed at a constant and equal horizontal velocity and with zero vertical velocity. The vertical displacement of successive electrons emerging from the modulator varies sinusoidally with time at the operating frequency.

The dimensions of the cavity resonator 1 and the frequency of energization from source 7 are so related that a resonant mode of oscillation of the $TE_{om1}$ class is set up. This designation of resonant mode of oscillation follows the convention employed by Sarbacher and Edson in the previously referred to publication, wherein the first, or $n$ subscript, designates the number of maxima of electric field intensity which occurs in the standing wave along the $y$ axis, the $m$ subscript designates the number of maxima of electric intensity which occurs along the $z$ axis, and the 1 subscript refers to the number of maxima of electric intensity which occurs along the $x$ axis. Preferably, the specific resonant mode of the $TE_{om1}$ class employed is the $TE_{011}$ mode, wherein the only vector of electric field intensity which appears is along the $y$ or vertical axis, the dimension 2 must be equal to half of the guide wave length, and the dimension 4 must also be equal to half of the guide wave length and the dimension 3 is not critical.

The accelerating voltage of battery 10 is critical for proper operation, its value being carefully adjusted to provide a critical velocity at which the electron beam traverses the resonator 1, this critical velocity being related to and dependent upon the operating frequency of the resonator 1 and the dimension 2. The required relationship between these parameters is defined by the requirement that the transit time of the electrons through the resonator 1 be an odd integral number of half periods, say perhaps nine. A rigorous mathematical analysis will show that when this relationship has been established, pure sinusoidal displacement modulation of the electron beam, as previously defined and as indicated by the electron beam pattern 12, will be attained as desired. If the electron beam velocity should be increased to the point where the transit time is equal to only seven half periods, the degree of displacement modulation is improved.

It is not necessary in order to attain sinusoidal displacement modulation that a $TE_{011}$ mode be employed. For instance, the $m$ subscript could be made any integral number desired by making the dimension 4 any integral number of guide half wave lengths, the only restriction in this respect being that the electron beam for maximum effect should traverse the resonator through an $x$—$y$ plane containing a maxima of electric intensity. Thus, if the $m$ subscript of the resonant mode employed were any odd integral number, a maxima would occur at the central $x$—$y$ plane of resonator 1, and the position of the grids 5 and 6 could be located, as shown. However, if the dimension 4 were an integral number of guide wave lengths so that the $m$ subscript of the resonant mode employed were an even integer, then a node would occur at the central $x$—$y$ plane and the grids would have to be displaced in the $z$ direction so as to lie in an $x$—$y$ plane containing a maxima. In this case, there would be a plurality of such planes, and the grids and the traversing electron beam could lie in any of them, or all of them if several beams were to be simultaneously modulated.

Also, instead of the dimension 2 being equal to a half guide wave length, it could be made equal to a whole guide wave length so that the 1 subscript of the resonant mode employed would be equal to 2. In such case, however, a different relationship is required to be set up between the electron beam velocity, the operating frequency, and the dimension 2, the required relationship in this case being such that the transit time through the resonator 1 is an even integral number of half periods, say perhaps 18. As before, the smaller this even integral number can be made by increasing the beam velocity, the better.

Referring now to Fig. 2, there is shown similar apparatus for producing a different type of electron beam modulation. This type of electron beam modulation is as indicated by the electron beam pattern 13, which is a picture of the emergent electrons taken at a particular instant. It will be referred to throughout the remainder of the specification as "sinusoidal transverse velocity modulation," and a modulating system for producing it will be referred to as a "sinusoidal transverse velocity modulator." Sinusoidal transverse velocity modulation is identical with the sinusoidal displacement modulation of Fig. 1 except that in this case successive electrons emerge from the modulator with zero vertical displacements, but with vertical velocities which vary sinusoidally with time at the operating frequency. The trace of the sinusoidal velocity modulated electron beam on collecting plate 9 is indicated at 14. It will be apparent that sinusoidal transverse velocity modulation is the same type of modulation as is ordinarily effected by a single pair of deflecting plates of a cathode ray tube when an alternating voltage is applied across the plates.

The cavity resonant apparatus for producing sinusoidal transverse velocity modulation is similar to that employed in Fig. 1 for producing sinusoidal displacement modulation, and identical characters of reference are employed to indicate corresponding parts. Obviously, however, since all electrons emerge with zero vertical displacements, it is not necessary to provide a vertically elongated emergence grid and accordingly a circular grid 15 is employed.

In the apparatus of Fig. 2, a resonant mode of the $TE_{om1}$ class must be employed. The $m$ subscript may be any integral number, the sole restriction being, as before, that the grids and the traversing electrons are aligned in a vertical plane containing a maxima of electric field intensity. However, the dimension 2, in order to obtain the sinusoidal transverse velocity modulation desired, is limited to being exactly one half of a guide wave length so that the 1 subscript of the resonant mode employed is equal to one.

Also, in order to obtain the sinusoidal transverse velocity modulation desired, the relationemerges from modulator 27 without having experienced any resultant displacement in the y direction experiences the maximum displacement in the z direction while traversing modulator 28. As is well known in the cathode ray tube art, when such 90° phase displaced displacements occur in mutually perpendicular directions, a constant resultant displacement is produced in a direction which rotates linearly with time at the operating frequency and a circular pattern results. Thus, the electron beam emerges from modulator 28 as a rotational displacement modulated beam, as indicated at 26, having a circular trace on collecting plate 9, as indicated at 30.

It will be apparent that each electron will traverse modulator 28 in a horizontal plane which will be offset from the central horizontal plane containing a maxima of field intensity by the amount of vertical displacement that that particular electron received from modulator 27. Accordingly, this vertical displacement must be kept to a minimum, and, as a result, rotational displacement modulated beams of large diameters cannot be produced with this apparatus.

Referring now to Fig. 5, there is shown cavity resonant modulating apparatus for producing an emergent beam modulated in a manner which will be designated as "rotational velocity modulation." A rotational velocity modulated beam will be defined as one wherein all electrons proceed at a constant velocity in a horizontal direction, and successive electrons contain, in addition, a perpendicular velocity component along a vector which rotates linearly with time at the operating frequency. Such a rotational velocity modulated electron beam is indicated by the expanding spiral 34 and its trace upon collecting plate 9 is indicated at 35. Modulating apparatus for producing this type of modulation will henceforth be referred to as a "rotational velocity modulator." This type of modulation will be recognized as that produced in a cathode ray tube by applying 90° phase displaced alternating voltages to mutually perpendicular pairs of deflecting plates.

This rotational velocity modulation is attained in Fig. 5 in a manner similar to that with which rotational displacement modulation was obtained in Fig. 4, the difference being that in the apparatus of Fig. 5, the electron beam is caused to successively traverse two sinusoidal transverse velocity modulators 32 and 33, whereas, in Fig. 4, two sinusoidal displacement modulators were employed. In this case, also, the distance between emergent grid 15 of modulator 32 and entrance grid 5 of modulator 33 is such that the transit time between these grids is exactly equal to an odd number of quarter periods.

Actually, absolutely true rotational velocity modulation cannot be obtained in this manner since the velocity modulation in the y direction and the velocity modulation in the z direction cannot be effected simultaneously. Accordingly, the velocity modulation in the y direction will have been integrated over a slightly longer period of time than the velocity modulation in the z direction at any particular y—z plane, such as collecting plate 9, and this will have the effect of warping the circular trace 35 into a slight ellipse with its major axis in the y direction. This effect, however, can be made relatively as negligible as desired by increasing the distance from emergent grid 15 of modulator 33 to collecting plate 9.

In an application where it is desired to have a rotational displacement modulated beam of a greater diameter than can be obtained with the apparatus of Fig. 4, a rotational velocity modulated beam may be allowed to expand in a low potential drift space, and thereafter accelerated, to thereby convert it to a substantially rotational displacement modulated beam in the same manner as a sinusoidal velocity modulated beam was converted to a sinusoidal displacement modulated beam in Fig. 3. As shown in Fig. 6, a rotational velocity modulator 36, which will be understood to include modulators 32 and 33 of Fig. 5, is employed in the manner described with respect to Fig. 5 to produce an emergent rotational velocity modulated beam, as indicated at 34. Electrodes 23, 23', and 24, which are identical to the corresponding electrodes of Fig. 3 and are identically connected to the battery 10, provide a low potential drift space 22 wherein the rotational velocity modulated beam 34 is allowed to rapidly expand to a large diameter. After acceleration by electrode 24 to a high horizontal velocity, the beam proceeds to collecting plate 9 with a negligible relative perpendicular velocity component, being thereby converted for all practical purposes to a large diameter rotational displacement modulated beam, as indicated at 26. Its trace on collecting plate 9 is indicated at 37.

It will be apparent to anyone skilled in the art that any and all of the various types of electron beam modulation obtained by means of the novel cavity resonator apparatus of Figs. 1 through 6 may also be obtained by conventional deflecting or modulating systems. For instance, sinusoidal transverse velocity modulation is the conventional type of electron beam modulation ordinarily encountered in a conventional cathode ray tube wherein it is obtained merely by permitting the electron beam to pass between a pair of deflecting plates to which an alternating potential difference is applied. Sinusoidal displacement modulation would be obtained with identical apparatus were the relationship between the electron velocity and the operating frequency such that the transit time through the alternating field were exactly equal to an integral number of periods of the operating frequency. In such a case, the integral of the accelerating force of the field on each electron over the transit time would be equal to zero, and consequently the electrons would emerge with zero velocity in the direction of the field but with displacements in this direction which would vary sinusoidally with time.

In a similar manner, rotational velocity modulation is the type of modulation ordinarily encountered in a conventional cathode ray tube wherein two pairs of mutually perpendicular deflecting plates are employed, the alternating voltages applied to the two pairs of plates being 90° phase displaced with respect to each other. In a similar vein, if the transit time of the electron beam through these two pairs of plates were made exactly equal to an integral number of periods, the type of electron beam modulation which has herein been defined as rotational displacement modulation would be obtained. It will be obvious also that suitable magnetic fields rather than electric fields could be utilized to provide the desired type of electron beam modulation.

However, the novel cavity resonant modulation systems of Figs. 1 through 6 are particularly suitable for operating frequencies in the ultra-high frequency range, whereas prior conventional modulating systems have not proved too satisfactory at these frequencies. For this reason, the modulating apparatus heretofore described with respect to Figures 1 through 6 are preferably employed in the apparatus of the following figures. It will be understood, however, that in the subsequent figures and the description thereof, whenever a sinusoidal modulator or a rotational modulator is called for, it is not thereby intended to limit the apparatus to the types shown in Figs. 1 through 6, but rather it is intended that any suitable means for providing sinusoidal or rotational modulation may be employed.

As previously stated, all of the presently known conventional types of ultra-high frequency vacuum tubes have low efficiencies. The present inventor has conceived that the efficiency of these tubes may be substantially improved by employing a suitably modulated electron beam in conjunction therewith, the modulated beam controlling the time and/or position of origin of operative electrons. In Figs. 7 through 14, apparatus is illustrated embodying these principles as applied to the Klystron or velocity modulated type of tube, the positive grid type of tube, and the magnetron type of tube.

Considering now the Klystron in particular, it is known that the bunching action provided by the buncher stage of the Klystron is never absolutely complete, and, as a result of this, the theoretical efficiency of the Klystron is generally given as about 57%. This inherent disadvantage of the Klystron can be readily seen by referring to the Applegate diagram for the Klystron which is reproduced as Fig. 17.7 on page 588 of the previously referred to publication by Sarbacher and Edson. Referring to that figure, and considering the action of electrons which traverse the center of the buncher stage during any one complete cycle of the operating frequency, it will be apparent that a consecutive half of these electrons are substantially completely bunched at the time they traverse the center of the catcher stage, and these bunched electrons can be made to contribute substantially all of their energies to the resonant electric field of the catcher stage. A nonconsecutive quarter of the electrons passing the center of the catcher in any one cycle are bunched to the extent that they traverse the catcher stage in the proper phase to give some, but not all, of their energy to the catcher stage. A final consecutive quarter of these electrons, however, are not bunched sufficiently well to traverse the catcher stage in the proper phase at all, and these electrons are accelerated by the resonant field of the catcher, and thus actually derive energy from it. Thus, the Klystron is adapted to use some of the electrons entering it to a much greater advantage than others, and still other of the electrons which enter actually minimize the effectiveness and efficiency of the Klystron tube. In Figs. 7 through 10, the electron beam, before being permitted to enter the Klystron, is first sinusoidally modulated, and this having been done, it is then possible to discriminate against, or in other words, block, those electrons which the Klystron cannot use to good advantage.

Figure 7:
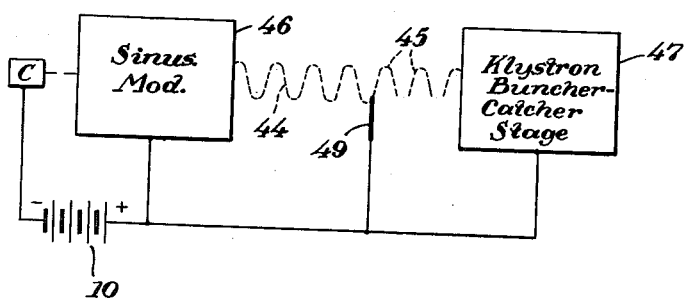
Fig. 7 is a diagrammatic view of one embodiment of the invention which involves the principles of operation of the Klystron ultra-high frequency type of tube.

Referring now to Fig. 7, a sinusoidal modulator 46 is provided, this modulator being preferably one of the types of apparatus shown in Figs. 1 through 3, although, as previously stated, it may be any of the conventional types of apparatus for producing sinusoidal modulation. Emerging therefrom there is shown a sinusoidally modulated electron beam 44. This beam is indicated to be a sinusoidal displacement modulated beam, and, of course, the modulating apparatus to produce such a beam would have to be a sinusoidal displacement modulator. However, in this figure, and in all the following figures wherein a sinusoidal displacement modulated beam is indicated, a sinusoidal transverse velocity modulated beam can be employed, the particular type of sinusoidal modulation to be used depending upon the specific requirements of any given application.

The sinusoidal modulated beam, after emergence from the sinusoidal modulator 46, proceeds past a blocking electrode 49, and then enters a conventional Klystron buncher-catcher stage 47 wherein it is treated in the same manner as the entering electron beam in the ordinary Klystron tube. Blocking electrode 49 and the Klystron buncher-catcher stage are connected to the positive side of battery 10 along with the sinusoidal modulator 46. The blocking electrode 49 is offset from the axis of symmetry of the sinusoidal modulated electron beam 44 by an amount just sufficient for it to block one quarter of the electrons contained in the beam, allowing unblocked portions 45 to proceed. The Klystron buncher-catcher stage 47 is accurately positioned from the sinusoidal modulator 46 such that the unblocked portions 45 enter the Klystron in the correct phase to receive the optimum bunching. Accordingly, the blocked portions of the beam include only those electrons which otherwise would have been so poorly bunched by the buncher stage of the Klystron that they would have absorbed energy from the catcher stage. In this manner, the loss of Klystron output due to the arrival at the catcher stage of electrons in the wrong phase is completely eliminated, and the efficiency of the tube is improved.

In the apparatus of Fig. 7, the amplitude of displacement modulation of electron beam 44 should be maintained at as small a value as possible consistent with efficient blocking by blocking electrode 49 of the undesired portion of the beam. It will be apparent that if the maximum displacement is too great, portions of the modulated beam will traverse the Klystron at a considerable distance from its central axis, wherein the maximum electric field exists. In order to minimize this effect, the central axis of Klystron 47 may be aligned with the median line through the unblocked portions 45 of the electron beam 44.

Figure 8:
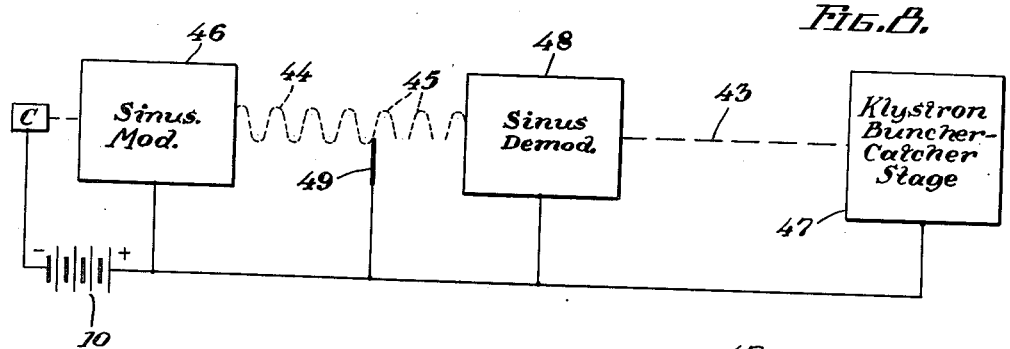
Fig. 8 is a diagrammatic view of another embodiment of the invention involving the principles of the Klystron.

In order to completely eliminate the last mentioned effect, and insure that all electrons proceed through the central axis of the Klystron 47, the modification shown in Fig. 8 may be employed. In this case, a sinusoidal demodulator 48 is inserted between the blocking electrode 49 and the Klystron 47 in order to demodulate the unblocked portions 45 of the beam, the corresponding but demodulated groups being indicated at 43. The sinusoidal demodulator 48 is constructed identically with the modulator 46, and is accurately positioned from modulator 46 by a distance such that the sinusoidal modulation provided by demodulator 48 is exactly 180° out of phase with respect to the sinusoidal modulation provided by modulator 46. Accordingly, every electron, in traversing sinusoidal demodulator 48, will experience a displacement increment exactly equal and opposite to that which it experienced in traversing sinusoidal modulator 46. The total displacement of each electron will thus be zero as indicated at 43.

Figure 9:
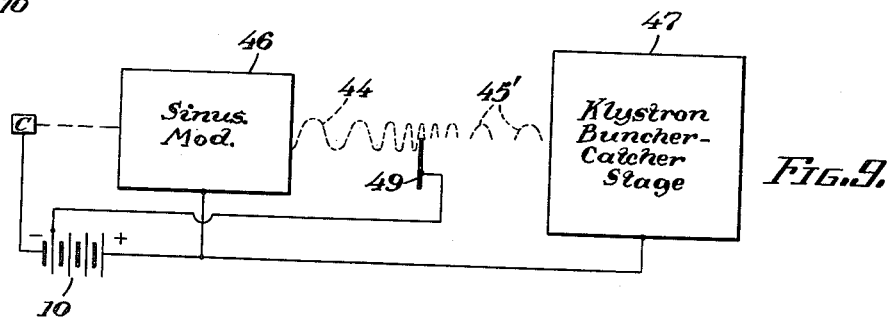
Fig. 9 is a diagrammatic view of still another embodiment of the invention involving the principles of the Klystron.

In Fig. 9 a further modification and improvement over the apparatus of Fig. 7 is shown. In this case, the blocking electrode 49, instead of being connected to the positive side of battery 10, is connected near but on the positive side of the negative terminal thereof. Also, the blocking electrode 49 extends upwardly to the axis of symmetry of the sinusoidally modulated beam 44 so as to block exactly one-half of the beam.

In operation, the electron beam 44 will be slowed down to a very low velocity corresponding to the low potential of electrode 49, and will then again be accelerated to a final constant high velocity at which it traverses the Klystron 47. Accordingly, the blocking of electrons by blocking electrode 49 will not involve any substantial loss of energy to heat because of the low velocity of the electrons at the time of striking this electrode. In this case, moreover, only those electrons are allowed to proceed and enter the Klystron which are of such a time phase relationship with respect to the electric field within the buncher stage that they may be substantially completely bunched so as to give up all of their energy to the catcher stage. In this apparatus, therefore, it will be apparent that there is substantially no loss of electron beam energy at any point. It will be understood that only that much of electrode 49 has been shown which is necessary to an understanding of its blocking function. Actually, of course, it will have any suitable configuration for defining a low potential region wherein all portions of the beam will be slowed down to the same extent.

Figure 10:
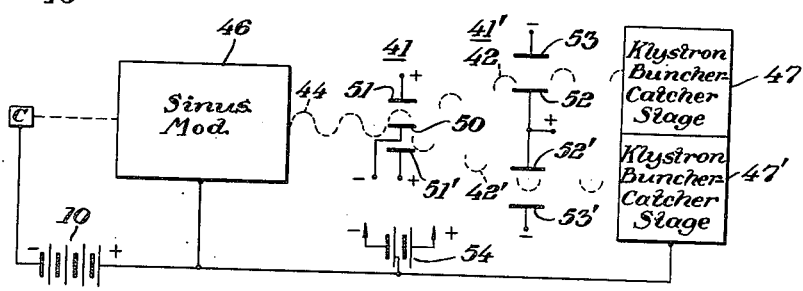
Fig. 10 is a diagrammatic view of yet another embodiment of the invention involving the principles of the Klystron.

Referring now to Fig. 10, the blocking electrode 49 of the previous three figures is replaced by two deflecting systems, indicated generally at 41 and 41'. Deflecting system 41 comprises a very thin central horizontal deflecting plate 50, positioned along the axis of symmetry of the sinusoidal modulated electron beam 44, and cooperating deflecting plates 51 and 51' positioned respectively above and below deflecting plate 50. Deflecting system 41' comprises upper and lower inner deflecting plates 52 and 52' respectively, and cooperating upper and lower outer deflecting plates 53 and 53', respectively. Deflecting plates 50, 53 and 53' are maintained at a negative potential with respect to the sinusoidal modulator 46 by being connected to the negative terminal of a direct current voltage source, indicated as battery 54, and deflecting plates 51, 51', 52, and 52' are maintained at an equal positive potential with respect to modulator 46 by being connected to the positive terminal of this battery. An intermediate point in battery 54 is connected, as shown, to the positive terminal of battery 10. In this case, an upper and a lower Klystron buncher-catcher stage 47 and 47' are provided, also connected to the positive terminal of battery 10.

In operation, it will be apparent that the sinusoidal modulated electron beam 44 will be split into upper and lower half portions 42 and 42' as it traverses the deflecting system 41, the upper portions 42 experiencing a constant vertical velocity upwardly, and the lower portions 42' experiencing an equal constant vertical velocity downwardly. As the half portions of the electron beam traverse the deflecting system 41', these vertical velocities are removed, and they again proceed in a horizontal and parallel direction, the half portions 42 being displaced vertically from the half portions 42'. The now separated half portions 42 and 42' are allowed to enter Klystron buncher-catcher stages 47 and 47', respectively, in the same manner as the unblocked portions 45 of Fig. 9 entered Klystron buncher-catcher stage 47. By the apparatus of Fig. 10, therefore, all of the electrons of the sinusoidally modulated electron beam 44 are effectively employed in the duplicate Klystron buncher-catcher stages without the necessity of blocking a portion of them. The two buncher-catcher stages will, of course, operate 180° out of phase with respect to each other. Their outputs could be conveniently combined by connecting them in push-pull relationship, for instance.

It will be readily apparent that a sinusoidal demodulator, such as was described with respect to Fig. 8, might be advantageously employed in the modification of Figs. 9 and 10 by being positioned just prior to the Klystron buncher-catcher stages thereof. Also, the blocking electrode 49 of Figs. 7 and 8 could be maintained at a very small positive potential, as is illustrated in Fig. 9, so as to decelerate the electron beam prior to its reaching this blocking electrode to thereby effect a reduction in the energy lost in heating this electrode.

Figure 11:
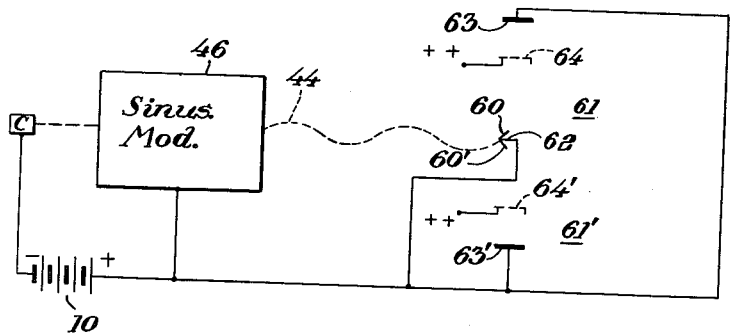
Fig. 11 is a diagrammatic view of an embodiment of the invention which involves the principles of operation of the positive grid oscillator type of tube.
Figure 12:
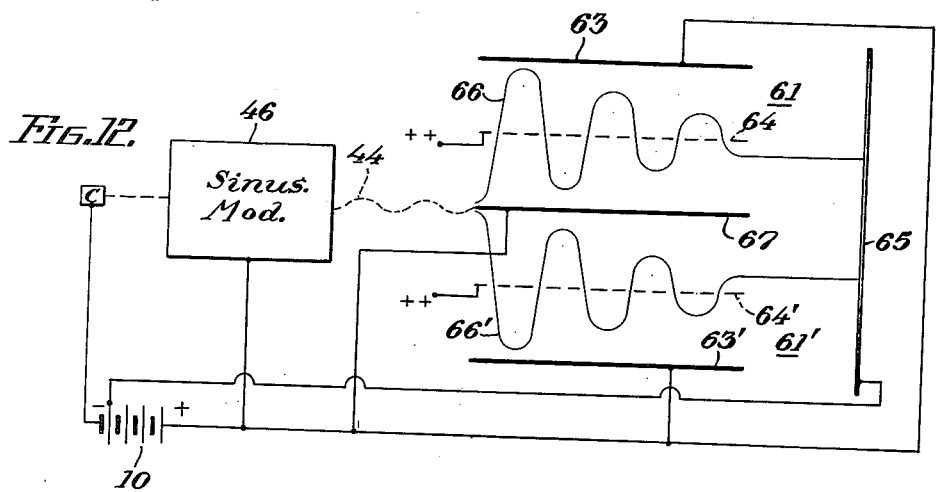
Fig. 12 is a diagrammatic view of another embodiment of the invention involving the principles of the positive grid oscillator.

As is well known, the positive grid or retarding field type of ultra-high frequency oscillator suffers from an inherent disadvantage that only half of all the electrons emitted by its cathode are of the proper phase to contribute energy to the alternating field, whereas the other half are of such a phase as to actually derive energy from the electric field. The undesired electrons of the incorrect phase are eliminated from the field after one or two cycles thereof so that the net effect of all the electrons is to contribute energy to the alternating field. Also, there is an inherent phase shift in the oscillations of the electrons which were originally of the proper phase so that eventually even these electrons begin to derive energy from the alternating field. The oscillator must be designed so that such electrons strike the grid before their phase shift reaches such objectionable proportions. In the apparatus of Figs. 11 and 12, a sinusoidally modulated electron beam is employed in conjunction with a positive grid oscillator in such a way as to eliminate these undesirable features.

Referring to Fig. 11, upper and lower positive grid oscillators 61 and 61', respectively, are schematically indicated. These two oscillators may be conventional in all respects except that the ordinary filamentary cathodes are replaced by a common source of electrons 62 having upper and lower faces 60 and 60' both of which are positioned slantwise so as to partially face the associated anodes 63 and 63', respectively, and to partially face the incoming sinusoidal modulated electron beam 44. The common electron source 62 and both anodes 63 and 63' are connected to the positive side of battery 10, while the grids 64 and 64' are maintained at a positive potential with respect to the electron source 62 and both anodes 63 and 63' by being connected to any suitable source of direct current voltage, not shown. The upper and lower slanted faces 60 and 60' forming the electron source 62 are constructed of, or coated with, a material, such as a cesium oxide composition, having a high secondary electron emission characteristic. The apex of the angle formed by faces 60 and 60' is aligned with the axis of symmetry of the sinusoidal modulated electron beam 44 which emerges from sinusoidal modulator 46.

In operation, the upper half portions of sinusoidal modulated electron beam 44 strike the upper face 60 during one-half of each cycle, thereby ejecting low energy secondary electrons to be employed as operative electrons for oscillator 61, and the alternate lower half portions of electron beam 44 strike face 60' during the following half of each cycle, thereby providing secondary electrons to be employed as operative electrons for oscillator 61'. The secondary electrons thus emitted are utilized in the regular manner by oscillators 61 and 61' to convert energy from the direct current source, not shown, to the alternating electric field.

It will be apparent that in the apparatus of Fig. 11, operative electrons originate in oscillators 61 and 61', respectively, for alternate one-half cycle periods, that is, while operative electrons are supplied by face 60 for oscillator 61, no operative electrons are originated in oscillator 61', and during the next half cycle, operative electrons are supplied to oscillator 61' and none are originated in oscillator 61. In this way, the two oscillators are permitted to operate 180° out of phase with respect to each other, and in such a manner that all operative electrons are of the proper phase to contribute energy to the alternating electric field, and no operative electrons are of such phase as to derive energy from the alternating electric field.

Referring now to Fig. 12 wherein similar principles are involved, the electron source 62 is replaced by an elongated very thin plate 67, which serves as a non-filamentary common cathode for oscillators 61 and 61'. Also, a collecting plate 65 is provided on the right-hand side of oscillators 61 and 61', and this plate is maintained at a very low positive potential by being connected to a suitable point on battery 10. The respective grids 64 and 64' and the respective plates 63 and 63' of both oscillators and the common cathode 67 are elongated, as shown, in the direction of motion of the modulated electron beam 44.

In the apparatus of Fig. 12, the electrons of the electron beam 44, themselves, are utilized as the operative electrons for both oscillators. They will arrive at the upper and lower oscillators 61 and 61' for alternate one-half cycle periods so as to provide operative electrons for both oscillators only in such phase that they contribute energy to the alternating electric field, in the same manner as explained with respect to Fig. 11. In this case, however, the horizontal motion of the entering electrons is relied upon to remove them from the oscillators prior to the time that the inherent phase shift of positive grid oscillators becomes objectionable. Thus, a typical path traversed by one of the electrons of an upper half portion of electron beam 44 is indicated at 66, and a typical path traversed one-half cycle later by one of the electrons of a lower half portion of beam 44 is indicated at 66'. After emergence from the positive grid oscillators 61 and 61', the electrons are decelerated so as not to lose all their kinetic energy to heat when they impinge upon collecting plate 65. As in Fig. 11, oscillators 61 and 61' will operate 180° out of phase with respect to each other and may be connected in push-pull, if desired.

Figure 13:
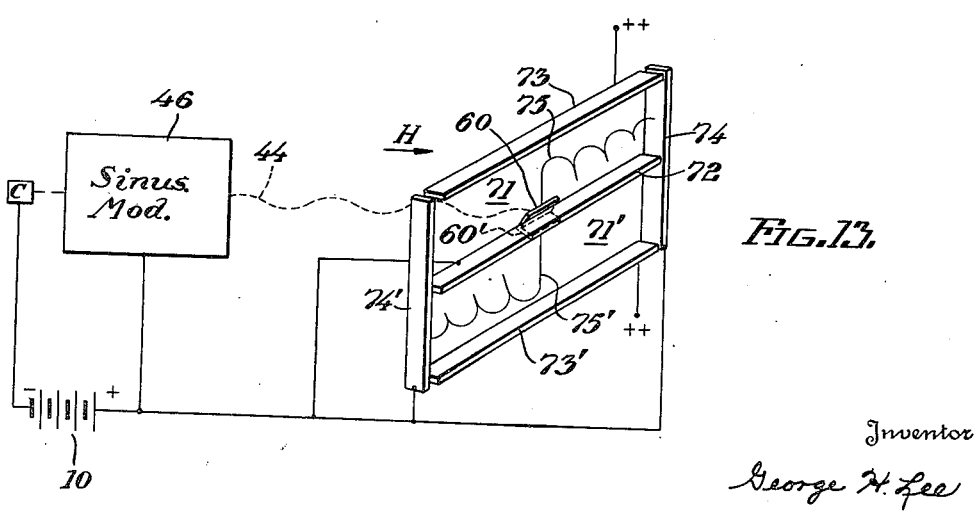
Fig. 13 is a diagrammatic view, partially in perspective, of an embodiment of the invention involving the principles of operation of the parallel plate magnetron.

In Fig. 13, the principles of Fig. 11 are applied to a parallel plate transit time magnetron type of ultra-high frequency tube. Upper and lower parallel plate magnetrons 71 and 71' are provided, these magnetrons being conventional except that the cathode employed is non-electron emissive, and takes the form of a common dividing plate 72. Centrally positioned on the left side of this plate is a source 62 of operative electrons for the magnetrons, this source being identical to that shown and described with respect to Fig. 11. Anode plates 73 and 73' for the respective magnetrons are maintained at a high positive potential with respect to the common cathode by a suitable direct current voltage source, not shown. Both magnetrons are elongated in the z direction, and end collectors 74 and 74' are provided at the extremities. These end plates and the common cathode 72 are connected to the positive side of battery 10 along with the sinusoidal modulator 46. The magnetic field H traverses both magnetrons in the x direction.

As in Fig. 11, the alternate bombardment of faces 60 and 60' by the upper and lower half portions, respectively, of the sinusoidal modulated electron beam 44 will provide operative electrons first to one magnetron for a half cycle duration and then to the other magnetron for a half cycle duration. As a result, operative electrons originate in each magnetron only in the proper phase to contribute energy to the high frequency alternating system, and none originate in such phase as to derive energy from the high frequency alternating system. A typical path which may be traversed by a secondary electron knocked off of face 60 by electrons contained in an upper half portion of beam 44 is indicated at 75, while 75' indicates a typical path traversed by a secondary electron knocked off of face 60' a half cycle later by the successive lower half portion of beam 44. As in Figs. 11 and 12, the two magnetrons will operate 180° out of phase with respect to each other.

It will be apparent that the apparatus of Fig. 13 could be modified so that the electrons of sinusoidal modulated beam 44, themselves, would serve as the operative electrons for the magnetrons, similarly to the apparatus of Fig. 12. In such a case, electron source 62 would be eliminated and the remaining portions of the magnetrons 71 and 71' would have to be elongated in the x direction sufficiently so that the electrons would not emerge therefrom due to their horizontal component of velocity prior to the time that they had contributed the maximum amount of energy to the alternating electric fields.

A rotational modulated electron beam may be employed to provide the operative electrons for a split-anode transit time type of magnetron, as shown in Fig. 14. In that figure, a rotational modulator 76, which may be any of the cavity resonant modulator systems described with respect to Figs. 4 through 6, or which may be any conventional type of modulating system adapted to produce the desired rotational modulation, provides a rotational modulated electron beam 77. Although this beam is indicated as a rotational displacement modulated beam, it will be understood that here, and also in Fig. 15, a rotational velocity modulated beam may be employed, the choice being dependent upon the relative advantage and convenience of the two under the conditions and circumstances of the particular application.

A split-anode transit time magnetron 78 is provided, its two anodes 81 and 81' being maintained at a high positive potential with respect to its cathode by a suitable source of direct current voltage, not shown. The magnetron 78 and its traversing magnetic field H extend laterally in the direction of motion of the rotational modulated electron beam 77. A non-filamentary needle like cathode 79 is disposed along the axis of the magnetron 78 and aligned with the axis of electron beam 77. Cathode 79 is connected, along with rotational modulator 76, to the positive side of battery 10. A collecting plate 80 on the emergent side of the magnetron is connected to a point of battery 10 having a low positive potential.

In operation, the electrons from beam 77 enter the magnetron around and at the left of cathode 79, and at an angular position which rotates with time at the operating frequency of the magnetron. As is well known, the operative electrons of a split-anode magnetron are caused by the influence of the magnetic and electric fields to progress around the cathode at this operating frequency, also. Each entering electron thus becomes an operative electron for the magnetron, originating at exactly the correct angular position so that it will pass the slits between plates 81 and 81' when the field is a maximum in a retarding direction. Thus, in this case, not only are all the operative electrons in the proper phase to contribute some energy to the high frequency system, but also they are in the correct phase to contribute a maximum and equal amount of energy to the high frequency system. The length of the magnetron 78 is correlated with the horizontal velocity of the electron beam 77 such that the electrons will require a sufficient length of time in traversing the magnetron to contribute the maximum amount of energy thereto. Upon emergence from the magnetron, the electrons are decelerated and eventually strike collecting plate 80 at a low velocity. The ultra-high frequency electromagnetic energy may be led off of the magnetron by suitable conventional connections. The magnetron could be of the 4 anode type, if desired. It will be noted that the apparatus of Fig. 14 avoids the necessity of tilting the magnetic field with respect to the magnetron axis or of providing an auxiliary axial electric field in order to eliminate spent electrons from the tube.

It will be apparent that in the apparatus of Fig. 14, also, operative electrons could be provided by bombardment of a secondary electron emitter by rotational modulated electron beam 77, rather than from the electrons contained in the beam, themselves. This could be accomplished by providing a conically shaped secondary electron emitter at the left of and capping cathode 79 so as to intercept beam 77. In such a case, the length of the magnetron 78 could be substantially reduced, if desired. However, means would have to be provided, as in the conventional split-anode magnetron, for removing the spent operative electrons from the system.

The positive grid and magnetron types of oscillator, the principles of which are employed in Figs. 11 through 14, fall within a general class of oscillators, known as "transit-time" oscillators, in which the transit time of the operative electrons is relied upon to establish oscillations. Figs. 11 through 14 are intended to represent the manner in which the principles of the present invention may be employed to improve the operation and efficiency of such "transit-time" tubes generally.

In Fig. 15, a rotational modulated beam is applied to an electron tube which is in many respects similar to the type of tube commonly referred to as a deflection valve, and described in an article entitled "Ultra-Short and Decimetre-Wave Valves" by F. M. Colebrook, which appeared in Wireless Engineer on page 198 of the April 1938 issue. In such tubes, it has been the practice to dispose a pair of collecting plates in the path of a sinusoidal modulated electron beam so that the plates alternately intercept electrons for half cycle periods. As brought out in the Colebrook article, however, such tubes suffer from an inherent difficulty arising from the large capacitance existing between the closely spaced collecting plates. This difficulty is overcome in the apparatus of Fig. 15.

As shown, a rotational modulator 76 provides an emergent rotational modulated electron beam 77. A single collecting anode 83 disposed in the path of the electron beam is connected to the positive side of battery 10, along with rotational modulator 76, by way of a parallel resonant tank circuit, indicated generally at 84. Resonant circuit 84 could of course be provided as a resonant wave guide or other suitable ultra-high frequency resonant device rather than as the conventional tank circuit indicated, if the operating frequency warrants. Collecting anode 83 is formed as a spiral having a shape identical to that of the rotationally modulated electron beam 77 and extending in the $x$ direction a distance equal to that traversed by an electron of the beam in one period of the operating frequency.

In operation, it will be apparent that anode 83 will intercept a separate group of electrons of beam 77 once every cycle, and will be struck by no electrons during the remaining portion of each cycle. Accordingly, a pulse of current will be transmitted to resonant circuit 84 once each cycle, and if this circuit is adapted to resonate at this frequency, the effect of these pulses will be cumulative and the magnitude of oscillations in the tank circuit will build up. High frequency electromagnetic energy may then be bled off of the resonant circuit 84 in any suitable manner.

Referring now to Fig. 16 wherein a principal embodiment of the invention is illustrated, a sinusoidal modulator 46 provides a sinusoidal modulated electron beam 44, as in prior figures. Electron beam 44 in this case traverses a hollow rectangular cavity resonator 86 having dimensions 87, 88, and 89 in the $x$, $y$ and $z$ directions, respectively, and provided with suitable vertically elongated centrally positioned entrance and emergent grids 90 and 90', respectively. This cavity resonator 86 is connected to the positive side of battery 10 along with the sinusoidal modulator 46. As will hereinafter be described in detail, the high frequency resonant electric field within resonator 86 derives energy from the kinetic energy of the traversing electron beam 44, and the low velocity emergent electrons continue on to a collecting plate 91, which is also connected to the positive side of battery 10.

Resonator 86 is so constructed and has dimensions such that standing waves of a resonant mode of the class $TE_{nmo}$ may be set up therein. In other words, the only vector of electric field present within the resonator in operation lies in the $x$ direction, and the intensity of this field varies sinusoidally in both the $y$ and $z$ directions. Preferably, and as shown, the specific resonant mode employed is the $TE_{210}$ mode. In order to attain this particular mode, of course, it is required that the dimension 88 in the $y$ direction be exactly equal to one guide wave length and the dimension 89 in the $z$ direction be exactly equal to one-half guide wave length. The dimension 87 in the $x$ direction is not critical in order to obtain the desired resonant mode. Nevertheless, for other reasons which will hereinafter become apparent, this dimension 87 is made sufficiently small that the transit time of the electron beam through the resonator is not greater than one-half of a period. Other resonant modes of the general class $TE_{nmo}$ can be employed, the only requirement being that the axis of electron beam 44 and grids 90 and 90' lie in an x—z plane containing a mode and in an x—y plane containing a maxima. The TE$_{210}$ resonant mode is the simples mode meeting the above requirements.

It will be apparent that the phase of the traversing electron beam may be so related to the phase of the ultra-high frequency resonant field within the resonator that electrons of beam 44 which have zero vertical displacement, that is, those lying on the axis of beam 44, pass the central y—z plane of resonator 86 at the same time that the electric field within the resonator reverses in direction. Accordingly, if the electrons in the upper half portions of beam 44 are retarded by the electric field, so also will be the electrons in the lower half portions of the beam. Accordingly, it will be apparent that under these conditions all electrons of beam 44 will be of the proper phase to give up at least some of their kinetic energy to the high-frequency field of resonator 86. The distance between modulator 46 and resonator 86 is adjusted so that the desired phase relationship described above is provided.

Considering the apparatus of Fig. 16 from a mathematical standpoint, the displacement $d$ in the $y$ direction of the electron passing the central y—z plane of resonator 86 at any time $t$ will be given by (1) $$d = D \sin \omega t$$

wherein D is the maximum vertical displacement experienced by any electron of the sinusoidal modulated beam 44, and $\omega$ equals $2\pi$ times the operating frequency.

At any displacement $d$ in the $y$ direction from the geometrical center of resonator 86, the maximum electric field $\epsilon$ is given by the following equation:

(2) $$\pi = E \sin 2\pi \frac{d}{\lambda}$$

wherein E is the maximum electric field intensity at any point in the resonator and $\lambda$ is the guide wave length. The instantaneous electric field intensity $e$ in a retarding direction at any displacement $d$ is of course (3) $$e = E \sin 2\pi \frac{d}{\lambda} \sin \omega t$$

assuming the aforesaid desired phase relationship has been established. Accordingly, the average retarding force $f$ which will be experienced by any electron in traversing resonator 86 may be given in terms of its vertical displacement $d$ and the time $t$ at which it passes the central y—z plane as follows:

(4) $$f = K \sin 2\pi \frac{d}{\lambda} \sin \omega t$$

wherein the proportionality constant K is proportional to the maximum electric field E and is dependent also upon the transit time through the resonator. It can be assumed as a fair approximation that the transit time of all electrons of electron beam 44 through resonator 86 is equal.

By substituting the Expression 1 for the vertical displacement $d$ in Equation 4, an expression for the average retarding force experienced by successive electrons of electron beam 44 in terms of the time at which they traverse the central y—z plane of resonator 86 may be obtained, as follows:

(5) $$f = K \sin 2\pi \frac{D \sin \omega t}{\lambda} \sin \omega t$$

Since the distance through which this average force operates is constant and equal to dimension 87 for all electrons, an expression for the energy W contributed by the electrons of electron beam 44 in terms of time of passing the central y—z plane of resonator 86 may be obtained, as follows:

(6) $$W = K' \sin 2\pi \frac{D \sin \omega t}{\lambda} \sin \omega t$$

wherein K' is equal to K times the dimension 87.

Figure 17:
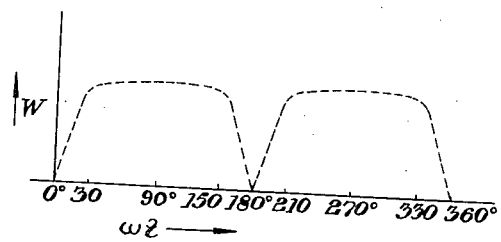
Fig. 17 is a graph useful in explaining the theory of operation of the apparatus of Figs. 16 and 18.

In Fig. 17, the relationship expressed by Equation 6 is plotted from $t=0°$ to $t=360°$, that is, for one complete cycle, for the case where the ratio $$\frac{D}{\lambda}$$

equals 5/12. It will be noted that, as previously brought out from physical consideration, the sign of the energy is the same for all electrons regardless of the point in the cycle at which they pass the central y—z plane of the resonator. In other words, all electrons will be of the proper phase to contribute energy to the resonator, and none will be of such a phase as to derive energy therefrom.

Moreover, it will be noted that the two portions of the graph are substantially flat-topped over a large portion of their range, which means that most electrons will contribute a substantially equal amount of energy to the resonator 86. The maximum electric field E within resonator 86 is made to have a value such that the electron which receives the greatest average retarding force during its passage through the resonator is just slowed down to substantially zero velocity so that all its kinetic energy is utilized. Since the substantially flat-topped portion of the graph of Fig. 17 extends over approximately two-thirds of the whole cycle, approximately two-thirds of all the electrons of beam 44 will each contribute substantially the same maximum amount of energy and will be slowed down to substantially the same extent.

It will be emphasized that the graph of Fig. 17 represents the case where the ratio $$\frac{D}{\lambda}$$

is equal to 5/12. This ratio is approximately the optimum ratio, and the apparatus of Fig. 16 is preferably designed to operate at approximately this ratio. Substantial variations from the optimum ratio lessen the flat-topped characteristic of the graph, which is of course undesirable.

An idea of the theoretical efficiency of the apparatus of Fig. 16 can be had by computing the ratio of average energy to maximum energy in the graph of Fig. 17. For the case where the ratio $$\frac{D}{\lambda}$$

equals 5/12, as represented by the graph of Fig. 17, this theoretical efficiency turns out to be about 69%, which is considerably higher than the corresponding figure ordinarily given for the Klystron tube. Because of the lessening of the flat-topped characteristic of the graph of Fig. 17 when the apparatus is operated with a ratio $$\frac{D}{\lambda}$$

substantially different from the optimum ratio, the theoretical efficiency decreases under such conditions.

Figure 18:
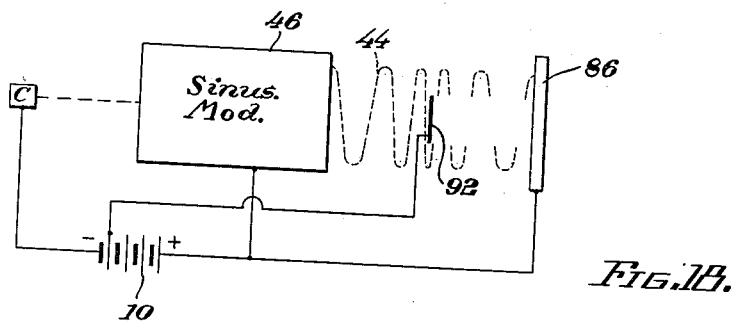
Fig. 18 is a diagrammatic view of a modification of the apparatus of Fig. 16.

Referring now to Fig. 18, wherein a modification and improvement of the apparatus of Fig. 16 is shown, a blocking electrode 92 is inserted in the path of the electron beam 44 prior to its traversing resonator 86. As shown, this blocking electrode is so positioned and is of such dimensions that it blocks that consecutive one-third portion of the electrons which do not occur in the substantially flat-topped region of the graph of Fig. 17. In this way, those electrons which traverse the central $y$–$z$ plane of resonator 86 during the 0°–30°, 150°–210°, and 330°–360° portions of each cycle are eliminated and not permitted to enter resonator 86. Accordingly, since the unblocked electrons now all contribute substantially equal amounts of energy to resonator 86, they all may be slowed down to a substantially zero horizontal velocity, and may be allowed to come to rest at this low velocity on the right-hand face of the resonator. Accordingly, in this case, no emergent grid 90' need be provided on the resonator 86, and, of course, no collecting electrode 91 is necessary. In order to minimize heat loss and further increase the efficiency of the apparatus, the electron beam 44 may be decelerated to a low velocity at blocking electrode 92 by connecting this electrode to a low potential point in battery 10, as shown, and as described with respect to Fig. 9. After passing blocking electrode 92, the unblocked electrons are again accelerated to a high velocity corresponding to the potential of the positive terminal of battery 10 and they then traverse resonator 86 at this constant high velocity.

From the foregoing, it will be realized that in the apparatus of Figs. 16 and 18, the inventor has utilized the sinusoidal spatial characteristic of the standing wave pattern which is established within any oscillatory electric field, such as within an excited cavity resonator. The inventor has realized that by controlling the point along the standing wave pattern at which an electron traverses a cavity resonator, the interchange of energy between the electron and the electric field within the resonator can be controlled, and that this phenomenon may be usefully employed. This concept has broader applications than the one described herein. For instance, in copending U. S. application serial No. 669,810 for frequency modulation system, filed May 15, 1946 in the name of the present inventor, now U. S. Pat. No. 2,511,860, issued June 20, 1950, wherein the concept is claimed broadly, the concept is employed for the purpose of electrically deriving a sinusoidal function of a variable quantity.

Although resonator 86 has been indicated to be rectangularly shaped in Figs. 16 and 18, it will be apparent to anyone skilled in the art that various configurations of resonator shapes could be employed to provide the desired type of standing wave patterns within the resonator. Resonator 86 may be thought of simply as a modified Klystron catcher stage, the modification being that the dimension of the resonator in the $y$ direction is equal to a full guide wave length rather than being equal to only one-half a guide wave length, so that the axis of the electron beam lies in a horizontal plane containing a node rather than a maxima.

It has heretofore been stated that although the modulated electron beams for the various modifications of the invention have been indicated in the drawings to be displacement modulated, nevertheless, velocity modulated beams could be employed, the choice being dependent upon the conditions and circumstances of the particular laboratory or commercial application. Some of the above modifications of the invention, however, would inherently operate more satisfactorily with a displacement modulated beam, other factors influencing the choice being equal. For instance, in Figs. 7 through 10, 12, 14, and 16 through 18, wherein the electrons contained in the modulated beam, themselves, are utilized as operative electrons during their subsequent horizontal traversal of an alternating field, it would be desirable to employ a pure sinusoidal displacement modulated beam, or a very slightly sinusoidal transverse velocity modulated beam, in order that the displacement of each electron be substantially constant during its traversal of the alternating field.

In the construction of apparatus according to the principles of the various above-described modifications of the invention, it is expected that any and all customary or desirable features or practises normally employed in the electron tube art may be resorted to, as required, in order to specifically adapt the apparatus to a particular application. For instance, it would no doubt be desired to enclose those portions of the apparatus, which are directly associated with the actual electric discharge phenomena, within an evacuated metal or glass container, as is the customary practise. Also, for the most part, in the drawings, the necessary means for applying the ultra-high frequency energy to, or deriving this energy from, the various cavity resonant systems has not been shown, it being considered that these connections are within the ordinary skill of the electron tube design engineer. In cases where the apparatus is utilized as an oscillator, it will be understood that all prior auxiliary equipment, such as the various modulators, may be energized from a portion of the energy derived from the final output stage. Although the various modifications of the invention have been described with particular reference to their use as oscillators, it will be apparent that the principles involved may readily be adapted, as desired, to all functions commonly performed by electron tubes, such as amplification, modulation, and detection.

In the foregoing description, and in the appended claims, it has been found desirable to employ the phraseology "standing wave pattern of electric field intensity in one direction," "standing wave pattern of electric field intensity along one direction" and similar phraseology. Whenever such phraseology is used, the "direction" referred to is that which extends along the axis of the standing wave pattern, which direction is perpendicular, and not parallel to, the actual direction of the electric field.

Since many changes could be made in the above construction, and many apparently widely different embodiments of this invention could be made without departing from the scope thereof, it is intended that all matter contained in the above description, or shown in the accompanying drawings, shall be interpreted as illustrative and not in a limiting sense.

What is claimed is:

1. Ultra-high frequency apparatus for providing a sinusoidal modulated electron beam, comprising a cavity resonator having an entrance grid in one face thereof for the entry of an unmodulated electron beam and an emergent grid in the opposite face thereof for the emergence of the sinusoidal modulated electron beam, said resonator having a length in the direction of traversal of the electron beam equal to at least one half guide wave length, and means for projecting an electron beam through said resonator at a velocity (V), said entrance and emergent grids being separated by a distance given by the expression $$Vn\frac{T}{4}$$

wherein $n$ is an even integer greater than two and T is the resonant period of said resonator.

2. Ultra-high frequency apparatus for providing a sinusoidal displacement modulated electron beam, comprising a cavity resonator having an entrance grid in one face thereof for the entry of an unmodulated electron beam and an emergent grid in the opposite face thereof for the emergence of the sinusoidal displacement modulated beam, said resonator having a length in the direction of traversal of the electron beam equal to one half guide wave length, and means for projecting an electron beam through said resonator at a velocity (V), said entrance and emergent grids being separated by a distance given by the expression $$Vn\frac{T}{2}$$

wherein $n$ is an odd integer greater than one and T is the resonant period of said resonator.

3. Ultra-high frequency apparatus for providing a sinusoidal displacement modulated electron beam, comprising a cavity resonator having an entrance grid in one face thereof for the entry of an unmodulated electron beam and an emergent grid in the opposite face thereof for the emergence of the sinusoidal displacement modulated beam, said resonator having a length in the direction of traversal of the electron beam equal to one guide wave length, and means for projecting an electron beam through said resonator at a velocity (V), said entrance and emergent grids being separated by a distance given by the expression $$Vn\frac{T}{2}$$

wherein $n$ is an even integer and T is the resonant period of said resonator.

4. An ultra-high frequency discharge device comprising an electron gun for forming a high velocity electron beam of uniform current density, means disposed directly in the path of said uniform current density beam for eliminating from said beam a consecutive portion of the electrons arriving at said means in every cycle of the operating frequency, and a Klystron buncher-catcher stage disposed in the path of the non-eliminated portions of said beam.

5. An ultra-high frequency discharge device comprising a pair of Klystron buncher-catcher stages, an electron gun for forming an electron beam containing operative electrons for said stages, and means for separating alternate half cycle portions of said beam and directing the respective half cycle portions toward said respective stages, whereby said stages will operate 180° out of phase with respect to each other.

6. An ultra-high frequency discharge device comprising electronic oscillating means utilizing the transit time of the operative electrons thereof for converting direct current electrical energy into ultra-high frequency alternating electrical energy, and means for supplying operative electrons for said oscillating means only during alternate half cycle periods.

7. An ultra-high frequency discharge device comprising electronic oscillating means utilizing the transit time of the operative electrons thereof for converting direct current electrical energy into ultra-high frequency alternating electrical energy, said oscillating means having a secondary electron emitting cathode for providing operative electrons for said means, and means for bombarding said cathode with primary electrons for alternate half cycle periods, whereby operative electrons are originated in said means for alternate half cycle periods only.

8. An ultra-high frequency discharge device comprising electronic oscillating means utilizing the transit time of the operative electrons thereof for converting direct current electrical energy into ultra-high frequency alternating electrical energy, an electron gun for projecting an electron beam toward said oscillating means to serve as the operative electrons therefor, and means interposed between said electron gun and said oscillating means for permitting only alternate half cycle portions of said beam to enter said oscillating means as the operative electrons therefore.

9. An ultra-high frequency discharge device comprising a pair of electronic oscillating means utilizing the transit time of the operative electrons thereof for converting direct current electrical energy into ultra-high frequency alternating electrical energy, and means for supplying operative electrons alternately to said respective oscillating means for half cycle periods, whereby said oscillating means will oscillate 180° out of phase with respect to each other.

10. A high frequency discharge device comprising an electron gun for forming an electron beam, means disposed in the path of said beam for rotationally modulating said beam, a collecting anode disposed in the path of said beam subsequent to said modulating means, said collecting anode having the spiral configuration of said beam and extending in the direction of motion of said beam a distance substantially equal to that travelled by an electron of said beam in one period of the operating frequency, whereby recurrent groups of electrons are periodically intercepted by said anode, and a resonant output circuit connected to said anode.

11. An ultra-high frequency discharge device comprising a cavity resonator having a length in a vertical direction equal to a guide wave length whereby said resonator is adapted to resonate in a mode wherein the sole vector of electric field intensity lies in opposite horizontal axial directions in upper and lower half portions of said resonator, respectively, and means for projecting a beam of high velocity electrons through said resonator in an axial direction at an instantaneous vertical displacement from the central axis thereof which varies sinusoidally in time phase with said electric field, whereby the traversing electrons are always retarded by said field.

12. An ultra-high frequency discharge device comprising an electron gun for forming a high velocity beam, a cavity resonator disposed in the path of said beam to be axially traversed by said beam to interchange energy therewith, electron beam modulating means interposed in the path of said beam subsequent to said electron gun and prior to said resonator for displacing the electrons of said beam in a transverse direction as a sinusoidal function of time at the resonant frequency of said resonator, and blocking means interposed in the path of said modulated beam for blocking a central portion only of said modulated beam.

13. An ultra-high frequency discharge device comprising an electron gun for forming a high velocity electron beam, a cavity resonator disposed in the path of said beam to be axially traversed by said beam to interchange energy therewith, electron beam modulating means interposed in the path of said beam subsequent to said electron gun and prior to said resonator for displacing the electrons of said beam in a transverse direction as a sinusoidal function of time at the resonant frequency of said resonator, and blocking means interposed in the path of said modulated beam for blocking substantially one-third of the electrons contained in said beam, said one-third being those electrons having the least transverse displacement.

14. The method of producing ultra-high frequency electromagnetic oscillations comprising the steps of establishing a substantially confined region adapted to support an oscillatory electric field having a standing wave pattern of electric field intensity extending in at least one direction, projecting electrons at a constant rate into said region in a direction parallel to said electric field for at least a major portion of a cycle of the operating frequency, and varying the point of entry of said electrons into said region over a substantial portion of said standing wave pattern in accordance with a sinusoidal function of time at the frequency of said oscillatory field.

15. An ultra-high frequency discharge device comprising an electron gun for forming a high velocity electron beam having a velocity (V), a cavity resonator disposed in the bath of said beam to be axially traversed by said beam to derive energy therefrom, said resonator having an electron beam entrance grid extending in a transverse direction for a substantial portion of the transverse dimension of said resonator, said resonator having a length in said transverse direction equal to a guide wave length, and a single electron beam sinusoidal modulating means interposed in the path of said beam between said electron gun and said resonator, said modulating means including a second cavity resonator adapted to resonate at the same frequency as said first resonator and having an entrance grid in one face thereof and an emergent grid in the opposite face thereof, said second resonator having a length in the direction of traversal of the electron beam equal to at least one half guide wave length, the entrance and emergent grids of said second resonator being separated by a distance given by the expression $$Vn\frac{T}{4}$$

wherein $n$ is an even integer greater than two and $T$ is the resonant period of said second resonator.

16. The method of producing ultra-high frequency electromagnetic oscillations comprising the steps of establishing a substantially confined region adapted to support an oscillatory electric field having a standing wave pattern extending in at least one direction, projecting electrons at a constant rate in the form of a beam into said region in a direction substantially parallel to said electric field for at least a major portion of a cycle of the operating frequency, varying the displacement between the point of entry of said beam and a nodal point of said standing wave pattern in accordance with a sinusoidal function of time at the frequency of said oscillatory field, and blocking a central portion only of said beam prior to its entry into said region, the blocked portion consisting of those electrons having the least displacement.

17. The method of producing ultra-high frequency electromagnetic oscillations comprising the steps of forming a substantially closed chamber adapted to support an oscillatory electric field having a standing wave pattern extending in at least one direction, projecting electrons in the form of a beam into said chamber and against the rear wall thereof in a direction substantially parallel to said electric field and normally at a nodal point of said standing wave pattern, and sweeping said beam in a lateral direction at the frequency of said oscillatory field over more than half a wave length of said standing wave pattern.

18. The method of producing ultra-high frequency electromagnetic oscillations comprising the steps of establishing a substantially confined region adapted to support an oscillatory electric field having a standing wave pattern extending in at least one direction, projecting electrons in the form of a beam into said region in a direction substantially parallel to said electric field and normally at a nodal point of said standing wave pattern, and sweeping said beam in a lateral direction at the frequency of said oscillatory field over substantially five-sixths of a wave length of said standing wave pattern.

19. The method of producing ultra-high frequency electromagnetic oscillations comprising the steps of establishing a substantially confined region adapted to support an oscillatory electric field having a standing wave pattern extending in at least one direction, projecting electrons in the form of a beam toward said region in a direction substantially parallel to said electric field, deflecting said beam in a lateral direction at the frequency of said standing wave pattern, and blocking that one-third of the deflected electrons having the least deflection prior to their entry into said region.

20. An ultra-high frequency discharge device comprising an electron gun for forming a high velocity electron beam, a cavity resonator disposed in the path of said beam to be axially traversed by said beam, said resonator having an entrance opening in one wall for the entrance of said beam and having its opposite wall formed entirely solid so as to prevent the emergence of said beam, said resonator having a length in a transverse direction equal to a whole guide wave length, said gun and resonator being disposed relative to each other such that the electron beam normally traverses said resonator at its midpoint, and deflecting means disposed between said gun and said resonator for varying in said transverse direction the displacement between the line of traversal of said beam and said midpoint as a sinusoidal function of time at the resonant frequency of said resonator.

21. An ultra-high frequency discharge device comprising an electron gun for forming a high velocity electron beam, a cavity resonator disposed in the path of said beam to be axially traversed by said beam, said resonator having a length in a transverse direction equal to a whole guide wave length, said gun and resonator being disposed relative to each other such that the electron beam normally traverses said resonator at its midpoint, and deflecting means disposed between said gun and said resonator for varying in said transverse direction the displacement between the line of traversal of said beam and said midpoint as a sinusoidal function of time at the resonant frequency of said resonator, said resonator having an entrance aperture in the forward wall thereof for accommodating said beam, said entrance aperture having a length in said transverse direction substantially greater than the width of said beam in said transverse direction, the rear wall of said resonator being formed entirely solid so as to prevent the emergence of said beam.

22. An ultra-high frequency discharge device comprising an electron gun for forming a high velocity electron beam, a cavity resonator disposed in the path of said beam to be axially traversed by said beam, said resonator having a length in a transverse direction equal to whole guide wave length, said gun and resonator being disposed relative to each other such that the electron beam normally traverses said resonator at its midpoint, and deflecting means disposed between said gun and said resonator for varying in said transverse direction the displacement between the line of traversal of said beam and said midpoint as a sinusoidal function of time at the resonant frequency of said resonator, said resonator having an entrance aperture for accommodating said beam, said entrance aperture having a length in said transverse direction substantially equal to five-sixths of a guide wave length.

23. An ultra-high frequency discharge device comprising an electron gun for forming a high velocity electron beam, a cavity resonator adapted to sustain electromagnetic oscillations having a standing wave pattern of electric field intensity extending in at least one direction, said cavity resonator having a length in the direction of said standing wave pattern equal to a guide wave length, said cavity resonator being disposed in the path of said beam to be traversed thereby, a deflecting system disposed between said gun and said resonator for deflecting said beam periodically at the resonant frequency of said resonator in the direction of said standing wave pattern, said resonator having an entrance aperture in one wall thereof for accommodating said beam, said aperture having a length in the direction of beam deflection substantially greater than the width of said beam in the direction of beam deflection, the wall of said resonator opposite to the apertured wall being formed entirely solid to prevent the emergence of said beam, and means interposed between said resonator and said deflecting system for blocking a least deflected portion of said beam.

24. An ultra-high frequency discharge device comprising an electron gun for forming a high velocity electron beam, a cavity resonator adapted to sustain electromagnetic oscillations having a standing wave pattern of electric field intensity extending in at least one direction, said cavity resonator having a length in the direction of said standing wave pattern equal to a guide wave length, said cavity resonator being disposed in the path of said beam to be traversed thereby, a deflecting system disposed between said gun and said resonator for deflecting said beam periodically at the resonant frequency of said resonator in the direction of said standing wave pattern, said resonator having an entrance aperture for accommodating said beam, said aperture having a length in the direction of beam deflection at least equal to $\frac{5}{24}$ of a guide wave length, and blocking means interposed between said resonator and said deflecting system for blocking a portion of said beam.

25. An ultra-high frequency discharge device comprising an electron gun for forming a high velocity electron beam, a cavity resonator adapted to sustain electromagnetic oscillations having a standing wave pattern of electric field intensity extending in at least one direction, said cavity resonator having a length in the direction of said standing wave pattern equal to a guide wave length, said cavity resonator being disposed in the path of said beam to be traversed thereby, a deflecting system disposed between said gun and said resonator for deflecting said beam periodically at the resonant frequency of said resonator in the direction of said standing wave pattern, said resonator having an entrance aperture for accommodating said beam, said aperture having a length in the direction of beam deflection substantially equal to $\frac{5}{6}$ of a guide wave length.

26. In high frequency electrical apparatus, in combination, an electron gun including a source of electrons and means forming a directed beam of said electrons, a high frequency circuit, said circuit including as a part thereof an electrically conductive member disposed subsequent to said electron gun in the direction of motion of said electrons for deriving high frequency electromagnetic energy from the kinetic energy of said electrons, said member having the shape of a helix having a uniform pitch and having a constant diameter comparable to the transverse dimension of said electron beam, the axis of the helix formed by said member being coincident with the axis of said beam, and an output circuit connected to said member for taking off said energy, the distance between adjacent turns of said helix being equal to the distance travelled by said electrons during one cycle of the operating frequency.

27. In high frequency electrical apparatus, in combination, an electron gun including a source of electrons and means forming a directed beam of said electrons the loci of the electrons of which beam form the elements of a hollow right circular cylinder, a high frequency electrical circuit, said circuit including as a part thereof an electrically conductive member disposed subsequent to said electron gun in the direction of motion of said electrons for deriving high frequency electromagnetic energy from the kinetic energy of said electrons, said member having the shape of a helix having a uniform pitch and having a constant radius comparable to that of said cylinder, the axis of the helix formed by said member being coincident with the axis of said cylinder, and an output circuit connected to said member for taking off said energy.

28. Ultra-high frequency electromagnetic apparatus, comprising a substantially closed cavity resonator having opposed electron beam entrance and emergent grids, means for projecting an electron beam through said resonator at a velocity (V), said resonator having a length in the direction of traversal of the electron beam equal to at least one half guide wave length, means for energizing said resonator to oscillate at an ultra high frequency, whereby a standing wave pattern of electric field intensity is established within said resonator, said entrance and emergent grids being separated by a distance given by the expression $$Vn\frac{T}{4}$$

wherein $n$ is an even integer greater than two and $T$ is the period corresponding to the oscillating frequency, the dimension of said resonator in the direction of the electric field being constant over the entire distance between the entrance and emergent grids.

29. A pulse generator circuit arrangement, comprising a source of oscillations having a given frequency, an electron discharge tube comprising means to form an electron beam and to direct said beam along a given path, deflecting means arranged about said path, means to apply said oscillations to said deflecting means to cause said beam to define a circular trace and an anode electrode comprising a helically shaped surface having a single convolution about a central axis coinciding with said path, said electrons having a given component of velocity along said path, said convolution having a given pitch substantially equal to the distance travelled by the electrons of said beam during a cycle of said oscillations, and means to derive from said anode the energy imparted thereto by said electron beam.

30. A pulse generator circuit arrangement, comprising a source of oscillations having a given frequency, an electron discharge tube comprising means to form an electron beam and to direct said beam along a given path, a plurality of deflecting electrodes arranged about said path, means to apply said oscillations to said deflecting electrodes to cause said beam to define a circular trace and an anode electrode comprising a helically shaped surface having a single convolution about a central axis coinciding with said path, said electrons having a given component of velocity along said path, said convolution having a given pitch substantially equal to the distance travelled by the electrons of said beam during a cycle of said oscillations, and means to derive from said anode the energy imparted thereto by said electron beam.

31. A pulse generator circuit arrangement, comprising a source of local oscillations having a given frequency, phase shifting means coupled to said source to produce phase shifted oscillations, an electron discharge tube comprising means to form an electron beam and to direct said beam along a given path, a pair of horizontal deflecting electrodes arranged about said path, a pair of vertical deflecting electrodes arranged about said path, means to apply said local oscillations to one of said pairs of deflecting electrodes and said phase shifted oscillations to the other pair of deflecting electrodes to cause said beam to define a circular trace and an anode electrode comprising a helically shaped surface having a single convolution about a central axis coinciding with said path, said electrons having a given component of velocity along said path, said convolution having a given pitch substantially equal to the distance travelled by the electrons of said beam during a cycle of said local oscillations, and means to derive from said anode the energy imparted thereto by said electron beam.

32. An electron discharge tube for producing electrical pulses having a given periodicity, comprising means to form an electron beam and to direct said beam along a given path with a given velocity, deflecting means arranged about said path, and adapted to cause said beam to define a circular trace, and an anode electrode comprising a helically shaped surface having a single convolution about a central axis coinciding with said path, said convolution having a pitch substantially equal to the distance travelled by the electrons of said beam during a period of said pulses.

33. In high frequency electrical apparatus, in combination, an electron gun including a source of electrons and means forming a directed beam of said electrons, a high frequency circuit, said circuit including as a part thereof an electrically conductive member disposed subsequent to said electron gun in the direction of motion of said electrons for deriving high frequency electromagnetic energy from the kinetic energy of said electrons, said member having the shape of a helix, the axis of the helix formed by said member being coincident with the axis of said beam, the distance between adjacent turns of said helix being equal to the distance travelled by said electrons during one cycle of the operating frequency.

References Cited in the file of this patent

UNITED STATES PATENTS

| Number | Name | Date |
|---|---|---|
| Re. 21,739 | Llewellyn | Mar. 4, 1941 |
| 2,272,165 | Varian et al. | Feb. 3, 1942 |
| 2,379,818 | Mason | July 3, 1945 |
| 2,399,325 | Condon | Apr. 30, 1946 |
| 2,407,707 | Kilgore | Sept. 17, 1946 |
| 2,409,608 | Anderson | Oct. 22, 1946 |
| 2,409,992 | Strobel | Oct. 22, 1946 |
| 2,415,749 | Malter | Feb. 11, 1947 |
| 2,433,044 | Haeff | Dec. 23, 1947 |
| 2,511,120 | Mueller | June 13, 1950 |
| 2,519,443 | Diemer et al. | Aug. 22, 1950 |